United States Patent
Cipu et al.

(10) Patent No.: US 11,831,763 B2
(45) Date of Patent: *Nov. 28, 2023

(54) METHODS, SYSTEMS, AND COMPUTER READABLE MEDIA FOR UTILIZING PREDETERMINED ENCRYPTION KEYS IN A TEST SIMULATION ENVIRONMENT

(71) Applicant: Keysight Technologies Singapore (Sales) Pte. Ltd., Singapore (SG)

(72) Inventors: Andrei Cipu, Bucharest (RO); Alexandru Badea, Calabasas, CA (US); George Ciobanu, Town Vaslui (RO)

(73) Assignee: KEYSIGHT TECHNOLOGIES SINGAPORE (SALES) PTE. LTD., Singapore (SG)

( * ) Notice: Subject to any disclaimer, the term of this patent is extended or adjusted under 35 U.S.C. 154(b) by 242 days.

This patent is subject to a terminal disclaimer.

(21) Appl. No.: 17/329,033

(22) Filed: May 24, 2021

(65) Prior Publication Data

US 2021/0281401 A1   Sep. 9, 2021

Related U.S. Application Data

(63) Continuation of application No. 14/014,315, filed on Aug. 29, 2013, now Pat. No. 11,063,752.

(30) Foreign Application Priority Data

Aug. 28, 2013 (RO) .............................. a 2013 00647

(51) Int. Cl.
*H04L 9/08*   (2006.01)
*H04L 9/40*   (2022.01)
(Continued)

(52) U.S. Cl.
CPC ............ *H04L 9/0841* (2013.01); *H04L 43/10* (2013.01); *H04L 43/50* (2013.01); *H04L 63/061* (2013.01); *H04L 63/164* (2013.01)

(58) Field of Classification Search
None
See application file for complete search history.

(56) References Cited

U.S. PATENT DOCUMENTS

| 4,200,770 A | 4/1980 | Hellman et al. |
| 8,190,895 B2 * | 5/2012 | Lauter ..................... H04L 63/06 713/171 |

(Continued)

OTHER PUBLICATIONS

Examiner's Answer for U.S. Appl. No. 14/014,315 (dated Apr. 18, 2019).

(Continued)

*Primary Examiner* — Amare F Tabor
*Assistant Examiner* — Mahabub S Ahmed

(57) ABSTRACT

Methods, systems, and computer readable media for utilizing predetermined encryption keys in a test simulation environment are disclosed. In one embodiment, a method includes generating, prior to an initiation of an Internet protocol security (IPsec) test session, a private key and a public key at a traffic emulation device and storing the private key and the public key in a local storage associated with the traffic emulation device. The method further includes retrieving, from the local storage, the private key and the public key upon the initiation of the IPsec test session between the traffic emulation device and a device under test (DUT) and generating a shared secret key utilizing the retrieved private key and a DUT public key received from the DUT.

20 Claims, 5 Drawing Sheets

(51) Int. Cl.
*H04L 43/50* (2022.01)
*H04L 43/10* (2022.01)

(56) References Cited

U.S. PATENT DOCUMENTS

| | | | | |
|---|---|---|---|---|
| 11,063,752 | B2 | 7/2021 | Cipu et al. | |
| 2005/0050328 | A1* | 3/2005 | Mizrah | H04L 9/0844 713/171 |
| 2006/0105741 | A1* | 5/2006 | Suh | H04W 12/04 455/410 |
| 2007/0006296 | A1* | 1/2007 | Nakhjiri | H04L 63/0272 726/15 |
| 2007/0186281 | A1* | 8/2007 | McAlister | H04L 63/20 726/14 |
| 2008/0010523 | A1 | 1/2008 | Mukherjee | |
| 2009/0161876 | A1* | 6/2009 | Sherkin | H04L 9/0844 380/278 |
| 2010/0058053 | A1* | 3/2010 | Wood | H04L 9/3247 713/155 |
| 2011/0188659 | A1* | 8/2011 | Khalid | H04L 9/0852 380/278 |
| 2012/0102298 | A1 | 4/2012 | Sengupta et al. | |
| 2012/0182884 | A1 | 7/2012 | Pyatkovskiy et al. | |
| 2015/0039890 | A1* | 2/2015 | Khosravi | H04L 63/061 713/171 |
| 2015/0067333 | A1 | 3/2015 | Cipu et al. | |
| 2017/0170956 | A1 | 6/2017 | Cipu et al. | |

OTHER PUBLICATIONS

Notice of Panel Decision from Pre-Appeal Brief Review for U.S. Appl. No. 14/014,315 (dated Feb. 7, 2019).
Advisory Action Before the Filing of an Appeal Brief, Examiner-Initiated Interview Summary, and AFCP 2.0 Decision for U.S. Appl. No. 14/014,315 (dated Nov. 28, 2018).
Notice of Allowance and Fee(s) Due for U.S. Appl. No. 14/966,552 (dated Oct. 1, 2018).
Final Office Action for U.S. Appl. No. 14/014,315 (dated Sep. 11, 2018).
Advisory Action, Examiner Initiated Interview Summary and AFCP 2.0 Decision for U.S. Appl. No. 14/966,552 (dated Apr. 10, 2018).
Non-Final Office Action for U.S. Appl. No. 14/014,315 (dated Feb. 7, 2018).
Final Office Action for U.S. Appl. No. 14/966,552 (dated Dec. 26, 2017).
Decision on Appeal for U.S. Appl. No. 14/014,315 (dated Oct. 27, 2017).
Non-Final Office Action for U.S. Appl. No. 14/966,552 (dated Jun. 23, 2017).
Examiner's Answer Before the Patent Trial and Appeal Board for U.S. Appl. No. 14/014,315 (dated Jun. 2, 2016).
"Diffie-Hellman key exchange," https://en.wikipedia.org/wiki/Diffie%E2%80%93 Hellman_key_exchange, pp. 1-11, (Jan. 23, 2016).
Commonly-Assigned, co-pending U.S. Appl. No. 14/966,552 for "Methods, Systems, and Computer Readable Media for Reducing the Size of a Cryptographic Key in a Test Simulation Environment," (unpublished, filed Dec. 11, 2015).
Advisory Action Before the Filing of an Appeal Brief for U.S. Appl. No. 14/014,315 (dated Sep. 30, 2015).
Final Office Action for U.S. Appl. No. 14/014,315 (dated Jun. 18, 2015).
"IxLoad™—Multiplay Service and Application Delivery Platform Testing," Overview, Data Sheet, pp. 1-11 (Jun. 2015).
Non-Final Office Action for U.S. Appl. No. 14/014,315 (dated Dec. 19, 2014).
Kaufman et al., "Internet Key Exchange Protocol Version 2 (IKEv2)," RFC 7296, pp. 1-142 (Oct. 2014).
Kaufman et al., "Internet Key Exchange Protocol Version 2 (IKEv2)," Section 2.12, RFC 5996, pp. 1-139 (Sep. 2010).
Maughan et al., "Internet Security Association and Key Management Protocol (ISAKMP)," RFC 2408, pp. 1-86 (Nov. 1998).

* cited by examiner

METHODS, SYSTEMS, AND COMPUTER READABLE MEDIA FOR UTILIZING PREDETERMINED ENCRYPTION KEYS IN A TEST SIMULATION ENVIRONMENT

PRIORITY CLAIM

This application is a continuation of U.S. application Ser. No. 14/014,315, filed Aug. 29, 2013, which claims the benefit of Romanian Patent Application No. a 2013 00647, filed Aug. 28, 2013, the disclosures of which are incorporated herein by reference in their entireties.

TECHNICAL FIELD

The subject matter described herein relates to conducting packet traffic simulations in a test simulation environment. More particularly, the subject matter described herein relates to methods, systems, and computer readable media for utilizing predetermined encryption keys in a test simulation environment.

BACKGROUND

Diffie-Hellman key exchange is an integral part of the Internet protocol security (IPsec) tunnel establishment process. However, this key exchange process accounts for a considerable amount of the processing time required to establish an IPsec tunnel. Specifically, the generation of a private key, a public key, and an associated shared secret key is extremely computationally intensive. Despite this significant drawback, large numbers of IPsec tunnels need to be established as promptly as possible in a test simulation environment. Thus, any reduction of time associated with the determining of encryption keys may be extremely beneficial for the sake of testing efficiency.

Thus, there exists a need for methods, systems, and computer readable media for utilizing predetermined encryption keys in a test simulation environment.

SUMMARY

Methods, systems, and computer readable media for utilizing predetermined encryption keys in a test simulation environment are disclosed. In one embodiment, a method includes generating, prior to an initiation of an Internet protocol security (IPsec) test session, a private key and a public key at a traffic emulation device and storing the private key and the public key in a local storage associated with the traffic emulation device. The method further includes retrieving, from the local storage, the private key and the public key upon the initiation of the IPsec test session between the traffic emulation device and a device under test (DUT) and generating a shared secret key utilizing the retrieved private key and a DUT public key received from the DUT.

The subject matter described herein for utilizing predetermined encryption keys may be implemented in hardware, software, firmware, or any combination thereof. As such, the terms "function", "module", "unit", or "node" as used herein refer to hardware, which may also include software and/or firmware components, for implementing the feature being described. In one exemplary implementation, the subject matter described herein may be implemented using a computer readable medium having stored thereon computer executable instructions that when executed by a hardware based processor of a computer control the computer to perform steps. Exemplary computer readable media suitable for implementing the subject matter described herein include non-transitory computer-readable media, such as disk memory devices, chip memory devices, programmable logic devices, and application specific integrated circuits. In addition, a computer readable medium that implements the subject matter described herein may be located on a single device or computing platform or may be distributed across multiple devices or computing platforms.

BRIEF DESCRIPTION OF THE DRAWINGS

Preferred embodiments of the subject matter described herein will now be explained with reference to the accompanying drawings, wherein like reference numerals represent like parts, of which.

DETAILED DESCRIPTION

Methods, systems, and computer readable media for utilizing predetermined encryption keys are disclosed. In one embodiment, the present subject matter involves the computation, at a traffic emulation device, of a private encryption key and a public encryption key that are used for a Diffie-Hellman key exchange prior to conducting any test simulation sessions (e.g., before any actual IPsec tunnel establishment). The computed encryption keys are then later retrieved upon the initiation of the one or more test sessions. Thus, the calculation of the encryption keys is performed only once for use in a test simulation involving a plurality of established IPsec tunnels. Notably, the present subject matter reduces and minimizes the time spent calculating the resource intensive encryption keys. Thus, a large number of IPsec tunnels may be established in a test simulation environment by reusing stored encryption keys.

Figure 1:
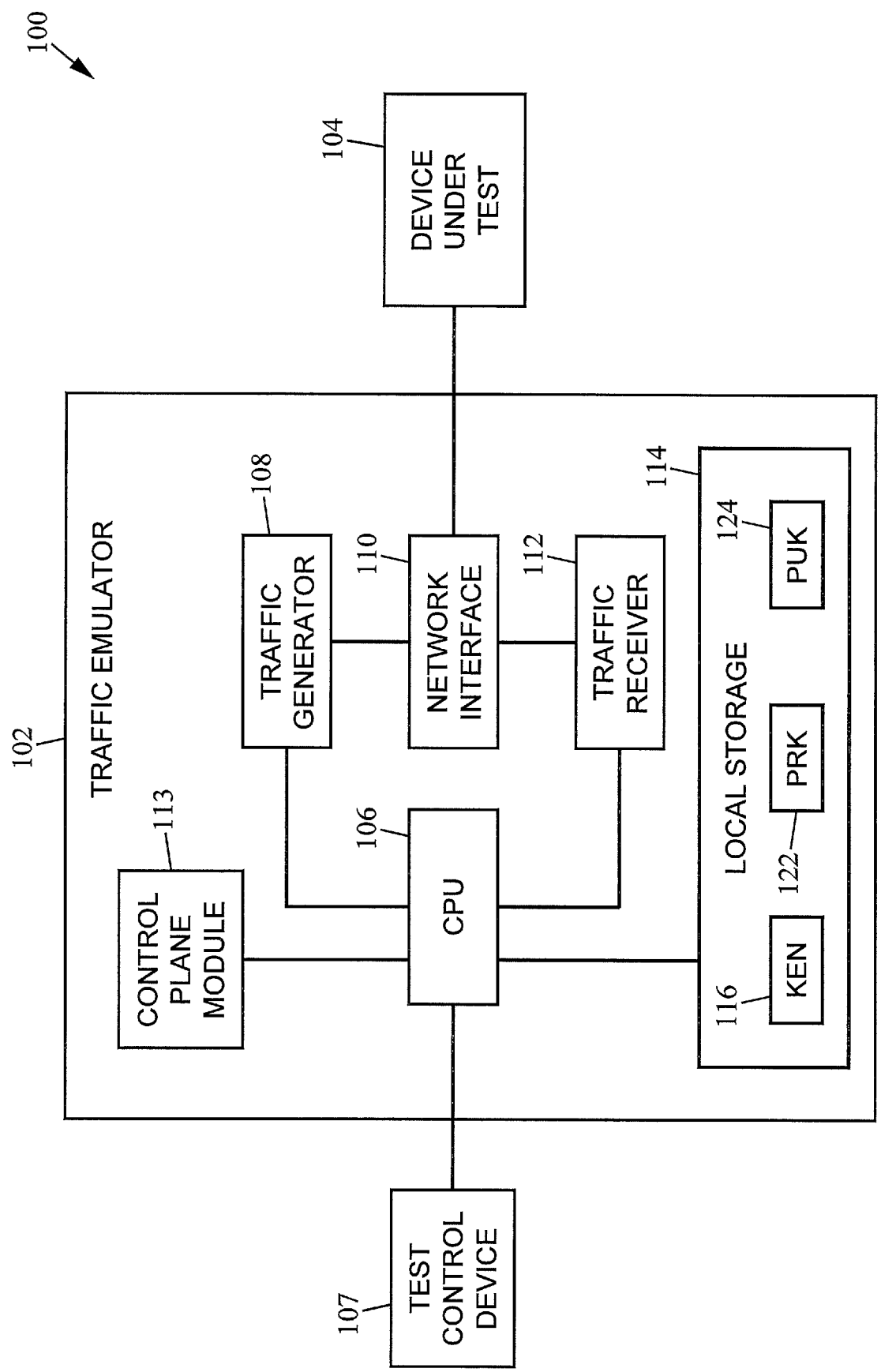
FIG. 1 illustrates a block diagram of an exemplary system for utilizing predetermined encryption keys in a test simulation environment according to an embodiment of the subject matter described herein.

FIG. 1 is a block diagram illustrating an exemplary architecture for a test simulation system 100 according to an embodiment of the subject matter described herein. Referring to FIG. 1, system 100 includes a traffic emulation device 102 that is communicatively connected to a test control device 101 and a device under test (DUT) 104. In some embodiments embodiment, DUT 104 may include a serving gateway (SGW), a packet data network gateway (PGW), a firewall device, a router device, or any device or system that may benefit from high throughput traffic simulation testing. In one embodiment, DUT 104 may be communicatively connected to traffic emulation device 102 via a wired or wireless connection that facilitates the transfer of encrypted packet traffic.

In some embodiments, traffic emulation device 102 may include a hardware based device or equipment that is configured to generate and send packet traffic to DUT 104 for load testing purposes. In one embodiment, traffic emulation device 102 may include a processor 106, a traffic generator unit 108, a network interface unit 110, a traffic receiver unit 112, a control plane module 113, and local storage 114. Processor 106 may include a central processing unit (CPU), a microcontroller, or any other hardware based processing unit that configured to manage and execute modules 108-114 in traffic emulation device 102. Processor 106 may also include memory and various specialized units, circuits, software and interfaces for providing the functionality and features described herein. In some embodiments, traffic emulation device 102 may function as either a client entity or a server entity.

In some embodiments, traffic generator unit 108 may include a voice module, which may be configured to generate audio traffic data, and a video module, which may be configured to generate video traffic data. In one example, voice module may include a software based module (when executed by a hardware based processor 106) that is configured to generate voice based simulation traffic in a particular L4-L7 protocol. For example, traffic generator unit 108 may be configured to generate real-time transport protocol (RTP) data that is ultimately forwarded to DUT 104. In addition, traffic generator unit 108 may be configured to encrypt the generated packet traffic, such as by utilizing IPsec. Packet traffic generated and encrypted by traffic generator unit 108 may be forwarded to network interface unit 110.

In some embodiments, network interface unit 110 may convert the outgoing test packet traffic from traffic generator unit 108 into an electrical, optical, or wireless signal format that is needed to transmit the test traffic to DUT 104 via a wire link, an optical fiber, a wireless link, or some other communication link. Similarly, network interface unit 110 may receive electrical, optical, or wireless signals from DUT 104 and may be configured to convert the received signals into incoming test traffic in a format usable (e.g., packets) by traffic emulation device 102. Received packets may be forwarded by network interface unit 110 to traffic receiver unit 112.

In some embodiments, traffic receiver unit 112 may receive the incoming test traffic from network interface unit 110. Traffic receiver unit 112 may be configured to determine if each received packet is a member of a specific flow, and may accumulate test statistics for each flow in accordance with test instructions provided by processor 106. The accumulated test statistics may include, for example, a total number of received packets, a number of packets received out-of-sequence, a number of received packets with errors, a maximum, average, and minimum propagation delay, and other statistics for each flow. Traffic receiver unit 112 may also provide test statistics and/or captured packets to processor 106 for additional analysis during, or subsequent to, the test session. In some embodiments, traffic receiver unit 112 may also be configured to decrypt packet traffic received from DUT 104.

In one embodiment, control plane module 113 may include a GPRS tunneling protocol (GTP) control plane module that is configured to conduct the negotiation associated with establishing IPsec tunnels in a test session. In some embodiments, the IPsec based test session is conducted between a traffic emulation device and a DUT at a network layer. For example, control plane module 113 may communicate with DUT 104 to establish a plurality of IPsec sessions that may be used to communicate encrypted media traffic.

In some embodiments, processor 106 may be configured to communicate with test control device 101. Test control device 101 may be a computing device contained within, or external to, traffic emulation device 102. Test control device 101 may provide processor 106 with instructions and data used by traffic emulation device 102 to conduct the testing of DUT 104. The instructions and data received by traffic emulation device 102 from test control device 101 may include, for example, definitions of packet streams to be generated by traffic emulation device 102 and definitions of performance statistics that may be accumulated and reported by traffic emulation device 102. In one embodiment, test control device 101 may be utilized by a network operator, a test simulation administrator, or any other user to initiate and/or establish parameters for a traffic test simulation involving traffic emulation device 102 and DUT 104.

In some embodiments, local storage 114 may include memory, a hardware based storage, a database, or any other local unit that is capable of electronically storing data information. For example, local storage 114 may be located within traffic emulation device 102. As shown in FIG. 1, local storage 114 may be used to store one or more private keys 122, one or more public keys 124, one or more key exchange numbers 116, and the like.

In some embodiments, control device 101 may be utilized by a network test operator to provide key exchange numbers to traffic emulation device 102. In response, traffic emulation device 102 may be configured to utilize the received key exchange numbers to calculate the private and/or public keys. Notably, determination of private and public keys is performed prior to establishing a test session with DUT 104. Traffic emulation device 102 may then subsequently store the calculated private and public keys in local storage 114 for later use upon establishing a test session with DUT 104. Traffic emulation device 102 may be configured to store the key exchange numbers prior to or after the calculation of the private and public keys.

Upon initiating a test session with DUT 104, traffic emulation device 102 may be configured to retrieve the previously calculated private and public keys that are stored in local storage 114. By retrieving private and public keys, traffic emulation device 102 is able to conserve valuable processing resources that are typically required to determine encryption keys upon establishing an IPsec tunnel associated with a test session.

After an IPsec tunnel is negotiated and established by control plane unit 113, traffic emulation device 102 may be configured to generate encrypted packet traffic (e.g., a flow of packets). For example, the encrypted traffic data may include RTP traffic data encrypted via IPsec. In one embodiment, traffic generator unit 108 may be instructed by test control device 101 to begin generating the traffic data needed for the test session.

After traffic emulator device 102 establishes the IPsec tunnel for communicating the media stream data to DUT 104, traffic emulation device 102 may encrypt the packet traffic data and forward the encrypted packet traffic data to network interface unit 110. Network interface unit 110 subsequently sends the encrypted packet traffic to DUT 104 via the established IPsec tunnel. In one embodiment, the simulated traffic data is encrypted and packetized prior to being sent over the established IPsec tunnel to DUT 104.

Figure 2A:
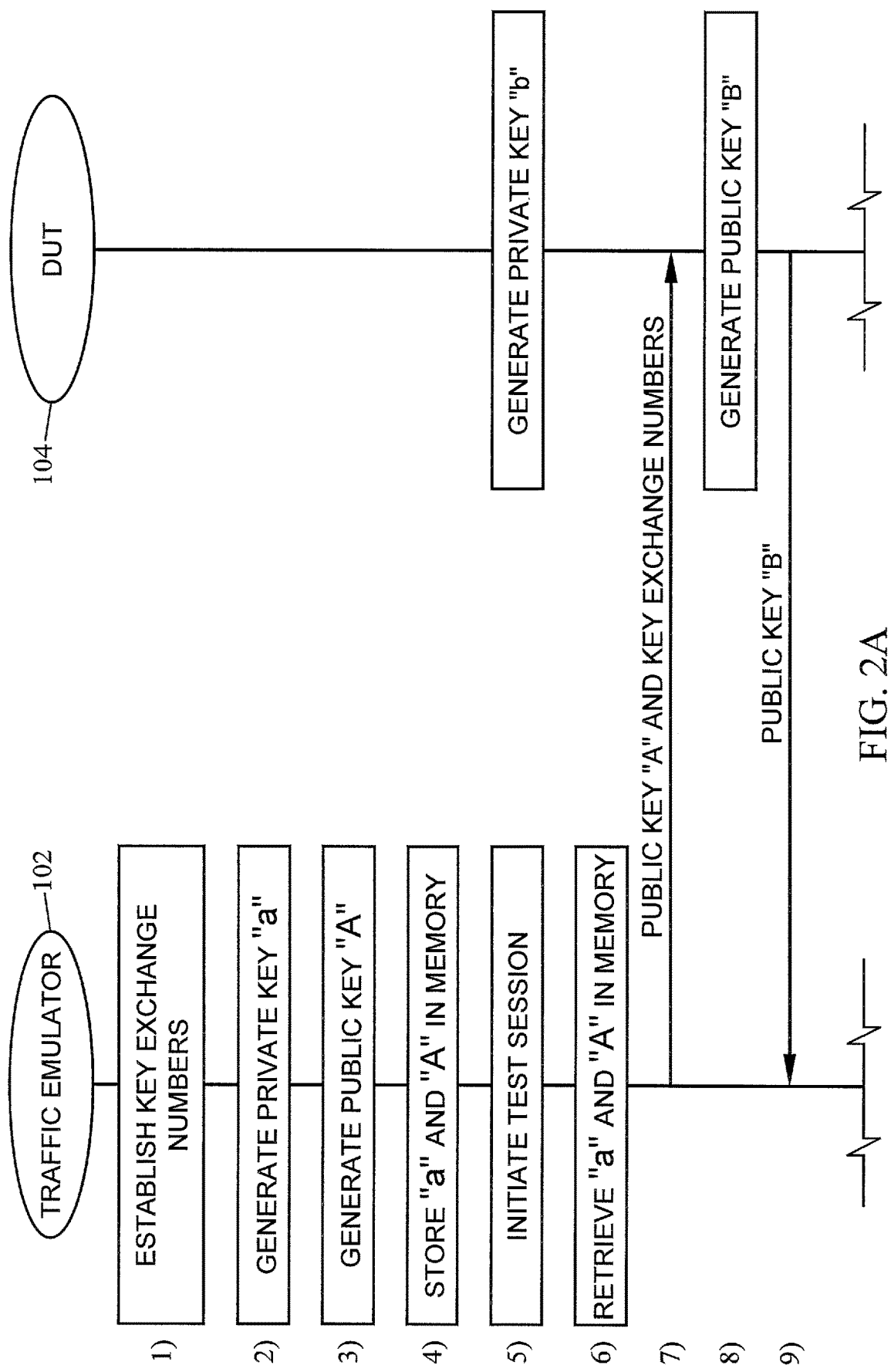
FIGS. 2A and 2B illustrate a signaling diagram depicting exemplary messaging for utilizing predetermined encryption keys in a test environment according to an embodiment of the subject matter described herein.
Figure 2B:
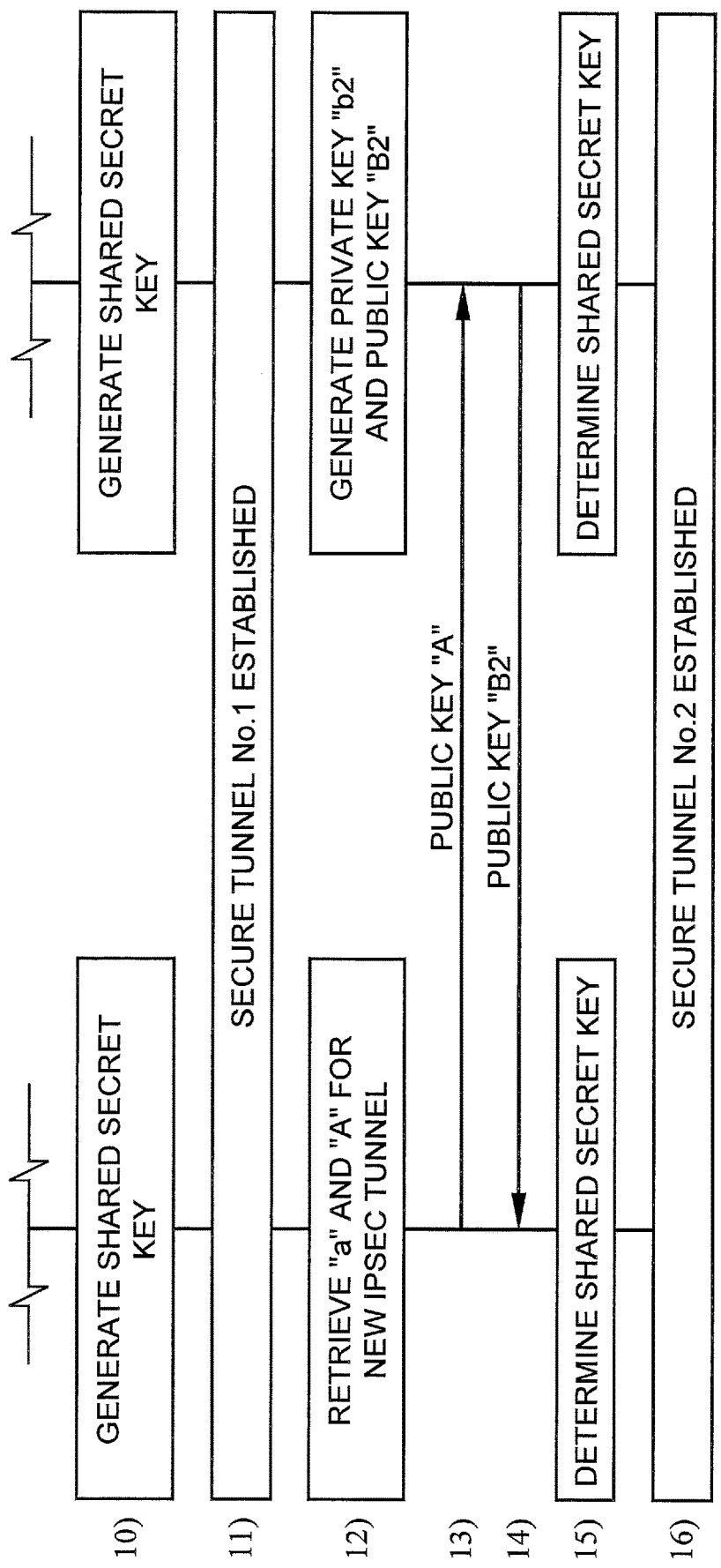

An illustration as to how these predetermined encryption keys are utilized are described in FIGS. 2A and 2B. Notably, FIGS. 2A and 2B illustrate a signaling diagram depicting exemplary messaging for utilizing predetermined encryption keys in a test simulation environment according to an embodiment of the subject matter described herein. In line 1, traffic emulation device 102 establishes or determines the key exchange numbers (e.g., "p" and "g") that may be potentially utilized in the test simulation with DUT 104. In one embodiment, key exchange number "g" may have a predetermined value (e.g., g=2) that is known and utilized by both traffic emulation device 102 and DUT 104. Alternatively, traffic control device 101 may be used to assign a value to key exchange number "g". Similarly, test control device 101 may also be used to select one or more potential key exchange numbers "$p_1$-$p_n$" that are likely to be compatible with and supported by DUT 104. In some embodiments, the one or more potential key exchange numbers may be stored as key exchange numbers 116 stored in local storage 114.

In line 2, traffic emulation device 102 generates a private key. In one embodiment, traffic emulation device 102 may generate a private key "a" prior to initiating a test session.

In line 3, traffic emulation device 102 generates a public key. In one embodiment, traffic emulation device 102 may generate a public key "A" prior to initiating a test session.

In line 4, traffic emulation device 102 stores the private key and the public key. In one embodiment, traffic emulation device 102 stores private key "a" and public key "A" in local storage, such as in memory or a local database, prior to initiating a test session.

In line 5, traffic emulation device 102 initiates a test session with DUT 104. At this time, DUT 104 may also generate a private key "b".

In line 6, traffic emulation device 102 retrieves the private key and the public key for use in the initiated test session. In one embodiment, traffic emulation device 102 retrieves private key "a" and public key "A" from local storage 114.

In line 7, traffic emulation device 102 sends public key "A" and one or more key exchange numbers (e.g., key exchange numbers "$p_1$-$p_5$") to DUT 104. In this example, key exchange number $p_1$ is associated with (and was used to generate) public key "A".

In line 8, DUT 104 utilizes one of the received key exchange numbers (e.g., "$p_1$") to generate a public key "B". In one embodiment, DUT 104 determines whether "$p_1$" is compatible with and supported by DUT 104 for testing purposes. If "$p_1$" is not supported or useable by DUT 104, then DUT 104 may select any other one of the received key exchange numbers (e.g., $p_2$-$p_5$). If none of the "p" numbers sent by traffic emulation device 102 are useable by DUT 104, DUT 104 may contact traffic emulation device 102 in order to request another "p" key exchange number.

In line 8, DUT 104 generates a public key "B". Specifically, once DUT 104 determines an acceptable "p" value (e.g., $p_1$), DUT 104 may generate a public key "B" using key exchange numbers, such as the "$p_1$" and "g" values.

In line 9, DUT 104 provides public key B to traffic emulation device 102. In line 10, both traffic emulation device 102 and DUT 104 are configured to generate a shared secret key. For example, traffic emulation device 102 may use the received public key "B" to calculate shared secret key "$s_{TE}$", where $s_{TE}=B^a$ mod p, where mod is a modulo mathematical operation. Similarly, DUT 104 may utilize received public key "A" to calculate shared secret key "$s_{DUT}$", where $s_{DUT}=A^b$ mod p. Notably, $s_{TE}$ is equal to $s_{DUT}$.

In line 11, a secure IPsec tunnel is established. In one embodiment, traffic emulation device 102 and DUT 104 utilize the shared secret key to exchange tunnel request and tunnel response messages to establish a first IPsec tunnel between the traffic emulation device 102 and DUT 104.

In line 12, traffic emulation device 102 initiates a new IPsec session (e.g., a second IPsec session) with DUT 104. In some embodiments, traffic emulation device 102 retrieves predetermined private key "a" and public key "A" from local memory. In some embodiments, the retrieval of the stored private key and the public key may be based on whether the same key exchange numbers are to be used to establish subsequent IPsec tunnels in the test simulation. Similarly, a DUT may also be configured to generate a new public key and a new private key in the event a new IPsec session is to be initiated. For example, DUT 104 may generate a new private key "b2" and a new public key "B2".

In lines 13 and 14, public keys are exchanged between traffic emulation device 102 and DUT 104. More specifically, traffic emulation device 102 sends predetermined public key "A" to DUT 104 and DUT 104 sends a new public key "B2" to traffic emulation device 102. In line 15, both traffic emulation device 102 and DUT 104 are each configured to generate a shared secret key. For example, traffic emulation device 102 may use the received public key "B" to calculate shared secret key "$s_{TE}$", where $s_{TE}=B^a$ mod p. Similarly, DUT 104 may utilize received public key "A" to calculate shared secret key "$s_{DUT}$", where $s_{DUT}=A^b$ mod p. As indicated above, $s_{TE}$ should be equal to $s_{DUT}$.

In line 16, a second secure IPsec tunnel is established. In one embodiment, traffic emulation device 102 and DUT 104 utilize the shared secret keys to exchange tunnel request and tunnel response messages to establish a second IPsec tunnel between the traffic emulation device 102 and DUT 104.

Figure 3A:
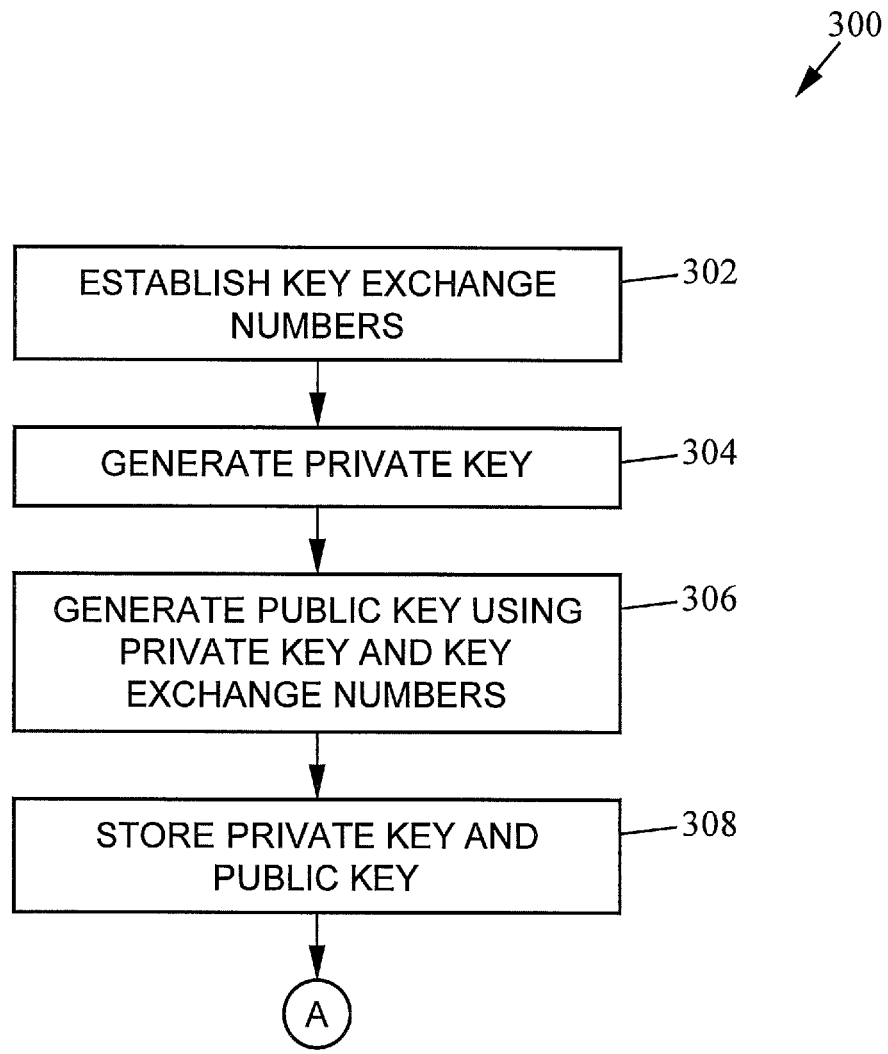
FIGS. 3A and 3B illustrate a flow chart of a method for utilizing predetermined encryption keys in a test simulation environment according to an embodiment of the subject matter described herein.
Figure 3B:
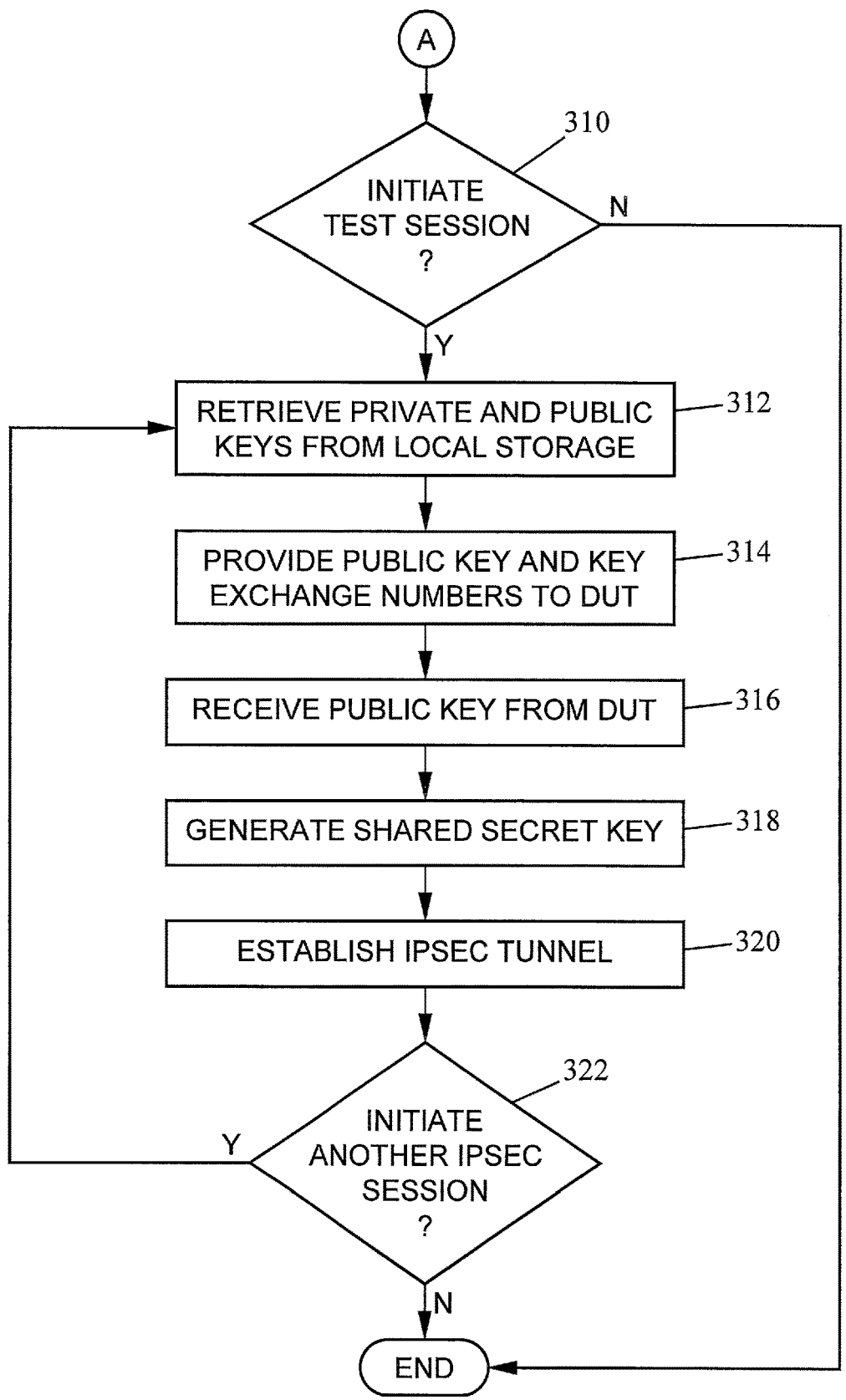

FIGS. 3A and 3B illustrate a flow chart of a method for utilizing predetermined encryption keys in a test simulation environment according to an embodiment of the subject matter described herein. In step 302, key exchange numbers are established. In some embodiments, the traffic emulation device may determine a plurality of different key exchange numbers that may possibly be utilized in a traffic simulation test. Notably, this step is conducted before any test sessions are initiated or established. In some embodiments, a key exchange number "g" may be set to a numerical value that is known by all DUTs, such as g=2. With respect to key exchange number "p", the traffic emulation device may provision a local storage unit (e.g., local memory or a local database) with a plurality of "p" values. Notably, the local storage unit may contain any number of "p" values, each of which is mapped to a corresponding private key and a corresponding public key that have been predetermined and/or precalculated.

In step 304, at least one private key is generated by the traffic emulation device. In some embodiments, the traffic emulation device may generate its own private key "a" that is known only to the traffic emulation device.

In step 306, at least one public key is generated by the traffic emulation device. In some embodiments, the traffic emulation device generates a public key utilizing one or more key exchange numbers (e.g., "p" and "g") and a private key previously generated by the traffic emulation device (see step 304). For example, the traffic emulation device may generate a public key "A", where A is equal to the product of $g^a$ and mod p, where mod is a modulo mathematical operation (e.g., $A=g^a$ mod p). In some embodiments, the traffic emulation device may be provisioned with a plurality of known "p" values that may be used in the course of a traffic simulation test. In such instances, the traffic emulation device may generate a unique public key for each of the plurality of known "p" values.

In step 308, the at least one private key and the at least one public key are stored. In some embodiments, the traffic emulation device stores the private key(s) and the public key(s) in local storage in the traffic emulation device. For example, the traffic emulation device may be configured to store each of the associated private and public keys along with a corresponding "p" value in a local database in the traffic emulation device.

At step 310, a determination is made as to whether to initiate a test session. In some embodiments, this determination may be made by a network operator utilizing a test control device (e.g., test control device 101 in FIG. 1). If an IPsec test session is to be initiated and conducted between the traffic emulation device and the DUT, then method 300 continues to step 312. Otherwise, method 300 ends.

In step 312, the stored private key and the public key are retrieved from local storage. In one embodiment, the traffic emulation device obtains the stored client private key and the server public key from the local memory on the traffic emulation device.

In step 314, the public key and at least one key exchange number are provided to the DUT. In some embodiments, the traffic emulation device may send a message containing a plurality of p values along with a public key that corresponds to at least one of the p values to the DUT. For example, the traffic emulation device may send potential p values $p_1$, $p_2$, $p_3$, $p_4$, and $p_5$ along with public key $A_1$ (which is associated with $p_1$). Upon receiving the message containing potential p values, the DUT makes a determination whether $p_1$ may be used for the test simulation. If $p_1$ can be used by the DUT, then the DUT utilizes the $p_1$ and the previously known g value to generate a public key B. In one embodiment, public key B is equal to $g^b$ mod p, where b is equal to a private key generated by the DUT.

If $p_1$ cannot be used (e.g., incompatible) by the DUT, the DUT then determines if one of $p_2$, $p_3$, $p_4$, and $p_5$ can be used in the test simulation. If it is determined that one of one of $p_2$, $p_3$, $p_4$, and $p_5$ can be used, then the DUT sends a message to the traffic emulation device indicating a p value selected by the DUT. In some embodiments, the DUT may also send a public key value B associated with the selected p value in the message to the traffic emulation device. If it is determined that none of $p_1$, $p_2$, $p_3$, $p_4$, and $p_5$ can be used by the DUT, then the DUT sends a message to the traffic emulation device indicating that all the previously provide p values are incompatible.

In step 316, a public key is received from the DUT. As indicated above, the DUT may utilize a private key, the $p_1$ value received from the traffic emulation device, and the previously known g value to generate a public key B. Upon generating public key B, DUT may send the public key B to the traffic emulator device.

In step 318, a shared secret key is generated. In some embodiments, the traffic emulation device utilizes its private key (e.g., private key "a") and the received DUT public key (e.g., public key "B") to determine a shared secret key "s", where s is equal to the product of $B^a$ and mod p. Similarly, the DUT may utilizes its own private key and the public key received from the traffic emulation device to also determine shared secret key s, where s in this instance is determined via the product of $A^b$ and mod p. Notably, the shared secret key s generated by both the traffic emulator device and the DUT is respectively equal to $B^a$ mod p and $A^b$ mod p.

In step 320, the IPsec tunnel is established. In one embodiment, each of the traffic emulator device and the DUT utilizes its shared secret key to complete the negotiation to establish the IPsec tunnel session.

In step 322, a determination is made as to whether another test session is to be initiated. For example, the traffic emulator device determines if a subsequent IPsec tunnel is to be established between the traffic emulation device and the DUT. If so, then method 300 loops back to step 312. Otherwise, method 300 ends.

It will be understood that various details of the presently disclosed subject matter may be changed without departing from the scope of the presently disclosed subject matter. Furthermore, the foregoing description is for the purpose of illustration only, and not for the purpose of limitation.

What is claimed is:

1. A method for utilizing predetermined key exchange data in a test simulation environment, the method comprising:
    prior to an initiation of a first test session, provisioning a device under test (DUT) with a first key exchange number that is known by both the DUT and a traffic emulation device configured to conduct the first test session, wherein the first test session is a test session involving a Diffie-Hellman key exchange;
    generating, prior to the initiation of the first test session, a private key and a public key at the traffic emulation device, wherein the public key is generated by the traffic emulation device using a second key exchange number;
    storing the private key and the public key in a local storage associated with the traffic emulation device, wherein the stored private key and the public key are mapped to the second exchange key number in the local storage;
    retrieving, by the traffic emulation device from the local storage, the second exchange key number, the private key and the public key upon the initiation of the first test session between the traffic emulation device and the DUT;
    providing the second exchange key number and the public key to the DUT, wherein the DUT utilizes the second exchange key number and the previously provisioned first exchange key number to generate a DUT public key;
    generating, by the traffic emulation device, a shared secret key utilizing the retrieved private key and the DUT public key generated by and received from the DUT; and
    retrieving, by the traffic emulation device, the private key and the public key from the local memory upon an initiation of a second test session between the traffic emulation device and the DUT and generating a second shared secret key utilizing the retrieved private key and a second DUT public key generated by and received from the DUT, wherein the second test session is a test session involving a Diffie-Hellman key exchange.

2. The method of claim 1 comprising determining, prior to generating the public key, at least one key exchange number.

3. The method of claim 2 wherein generating the public key includes deriving the public key using the at least one key exchange number.

4. The method of claim 3 comprising sending the public key and the at least one key exchange number to the DUT.

5. The method of claim 1 comprising receiving the DUT public key from the DUT upon the initiation of the first test session.

6. The method of claim 1 wherein the traffic emulation device functions as either a client entity or a server entity.

7. The method of claim 1 wherein the public key is generated using the private key and the at least one key exchange number.

8. The method of claim 1 wherein each of the private key, the public key, and the shared secret key is generated utilizing a Diffie-Hellman method.

9. The method of claim 1 wherein the DUT includes at least one of: a firewall device, a router device, and a serving gateway (SGW), a packet data network gateway (PGW).

10. A system for utilizing predetermined encryption keys data in a test simulation environment, the system comprising:
  a device under test (DUT) comprising a hardware processor configured to generate a DUT public key and to be subjected to a first test session, wherein the first test session is a test session involving a Diffie-Hellman key exchange; and
  a traffic emulation device comprising a hardware processor configured to provision, prior to an initiation of the first test session, the DUT with a first key exchange number that is known by both the DUT and the traffic emulation device, to generate, prior to the initiation of the first test session with the DUT, a private key and a public key, wherein the public key is generated by the hardware processor of the traffic emulation device using a second key exchange number, to store the private key and the public key in a local storage, wherein the private key and the stored public key are mapped to the second exchange key number in the local storage, to retrieve the second exchange key number, the private key and the public key from the local storage upon the initiation of the first test session, to provide the second exchange key number and the public key to the DUT, wherein the hardware processor of the DUT utilizes the second exchange key number and the previously provisioned first exchange key number to generate a DUT public key, to generate a shared secret key utilizing the retrieved private key and the DUT public key generated by and received from the hardware processor of the DUT, to retrieve the private key and the public key from the local memory upon an initiation of a second test session between the traffic emulation device and the DUT wherein the second test session is a test session involving a Diffie-Hellman key exchange, and to generate a second shared secret key utilizing the retrieved private key and a second DUT public key generated by and received from the hardware processor of the DUT.

11. The system of claim 10 wherein the hardware processor of the traffic emulation device is further configured to determine, prior to generating the public key, at least one key exchange number.

12. The system of claim 11 wherein the hardware processor of the traffic emulation device is further configured to derive the public key using the at least one key exchange number.

13. The system of claim 12 wherein the hardware processor of the traffic emulation device is further configured to send the public key and the at least one key exchange number to the DUT.

14. The system of claim 10 wherein the hardware processor of the traffic emulation device is further configured to receive the DUT public key from the DUT upon the initiation of the first test session.

15. The system of claim 10 wherein the traffic emulation device functions as either a client entity or a server entity.

16. The system of claim 10 wherein the public key is generated using the private key and the at least one key exchange number.

17. The system of claim 10 wherein each of the private key, the public key, and the shared secret key is generated utilizing a Diffie-Hellman method.

18. The system of claim 10 wherein the DUT includes at least one of: a firewall device, a router device, and a serving gateway (SGW), a packet data network gateway (PGW).

19. A non-transitory computer readable medium having stored thereon executable instructions that when executed by a processor of a computer control the computer to perform steps comprising:
  prior to an initiation of a first test session, provisioning a device under test (DUT) with a first key exchange number that is known by both the DUT and a traffic emulation device configured to conduct the first test session, wherein the first test session is a test session involving a Diffie-Hellman key exchange;
  generating, prior to the initiation of the first test session, a private key and a public key at the traffic emulation device, wherein the public key is generated by the traffic emulation device using a second key exchange number;
  storing the private key and the public key in a local storage associated with the traffic emulation device, wherein the stored private key and the public key are mapped to the second exchange key number in the local storage;
  retrieving, by the traffic emulation device from the local storage, the second exchange key number, the private key and the public key upon the initiation of the first test session between the traffic emulation device and the DUT;
  providing the second exchange key number and the public key to the DUT, wherein the DUT utilizes the second exchange key number and the previously provisioned first exchange key number to generate a DUT public key;
  generating, by the traffic emulation device, a shared secret key utilizing the retrieved private key and the DUT public key generated by and received from the DUT; and
  retrieving, by the traffic emulation device, the private key and the public key from the local memory upon an initiation of a second test session between the traffic emulation device and the DUT and generating a second shared secret key utilizing the retrieved private key and a second DUT public key generated by and received from the DUT, wherein the second test session is a test session involving a Diffie-Hellman key exchange.

20. The non-transitory computer readable medium of claim 19 wherein the traffic emulation device is further configured to determine, prior to generating the public key, at least one key exchange number.

* * * * *